United States Patent [19]

Kehrer

[11] Patent Number: 4,697,550
[45] Date of Patent: Oct. 6, 1987

[54] DEVICE FOR COOLING A REACTOR

[75] Inventor: Wolfgang Kehrer, Berlin, Fed. Rep. of Germany

[73] Assignee: Borsig GmbH, Berlin, Fed. Rep. of Germany

[21] Appl. No.: 927,240

[22] Filed: Nov. 4, 1986

[30] Foreign Application Priority Data

Feb. 21, 1986 [DE] Fed. Rep. of Germany ....... 3605584

[51] Int. Cl.$^4$ .............................................. F22B 1/02
[52] U.S. Cl. ........................................ 122/34; 122/21; 122/438; 122/442; 122/487; 122/489; 122/492
[58] Field of Search ............... 122/5.5 A, 5.5 R, 31 R, 122/32, 33, 34, 21, 488, 489, 492, 487, 412, 438, 441, 442, 492; 62/376

[56] References Cited

U.S. PATENT DOCUMENTS

| 699,038 | 4/1902 | Thoens | 122/34 |
| 3,886,906 | 6/1975 | Wolfgarten | 122/34 X |
| 3,938,473 | 2/1976 | Mayer et al. | 122/32 |
| 4,257,356 | 3/1961 | Minnick | 122/32 |
| 4,530,347 | 7/1985 | Baker et al. | 122/31 R X |

Primary Examiner—Albert J. Makay
Assistant Examiner—Steven E. Warner
Attorney, Agent, or Firm—Max Fogiel

[57] ABSTRACT

A device for cooling a reactor positioned in a vessel. The vessel comprises a water space and a steam space. Cooling pipes that convey evaporating water extend through the reactor. The pipes communicate outside the reactor with the water space at the intake end and with the steam space at the outflow end. The object is to prevent local excess cooling that would interfere with the reaction. A fresh-water preheating section is positioned inside the steam space. The preheating section communicates with an inflow outside the vessel and with an outflow inside the steam space. The preheating section also has open pipes extending through it from top to bottom into the steam space.

3 Claims, 2 Drawing Figures

DEVICE FOR COOLING A REACTOR

BACKGROUND OF THE INVENTION

The present invention relates to a device for cooling a reactor positioned in a vessel that comprises a water space and a steam space, whereby cooling pipes that convey evaporating water extend through the reactor and communicate outside the reactor with the water space at the intake end and with the the steam space at the outflow end. Devices of this type operate by employing evaporating water to divert the heat released by exothermal chemical reactions. This type of heat diversion provides an advantage over cooling with a non-evaporating coolant. Since the water, which evaporates as it flows, will evaporate at practically the same temperature at all points in the reactor, a uniform reaction temperature that is optimum in terms of carrying out the reaction will prevail throughout the reactor. The method also has a drawback, however. The water that is converted into steam is constantly replenished with fresh water. When the temperature of the fresh water drops below the evaporation point, the lower temperature will prevail locally in a certain area of the reactor to the detriment of the reaction in that area.

SUMMARY OF THE INVENTION

The object of the present invention is to improve a device of the aforesaid genus to the extent that excess local cooling does not occur when fresh water is supplied.

This object is attained in a device of the aforesaid type by means of an improvement wherein a fresh-water preheating section is positioned inside the steam space, communicates with an inflow outside the vessel and with an outflow inside the steam space, and has open pipes extending through it from top to bottom into the steam space.

The fresh water is pre-heated to approximately the evaporation point as it flows through the preheating section by the steam already generated in the reactor. The accordingly heated fresh water can, as it leaves the preheating section, permeate the vessel's water space uniformly, preventing local excess cooling.

The inflow can be connected to the bottom of the preheating section, which can have an effluent weir on the side remote from the inflow.

An ascending pipe can be positioned along the longitudinal axis of the vessel, extending through the water space and into the steam space, and the preheating section can be cylindrical, surrounding the ascending pipe to create an annular gap.

The pipes can extend beyond the top of the preheating section.

A preferred embodiment of the invention will now be described with reference to the attached drawings, wherein

DETAILED DESCRIPTION OF THE PREFERRED EMBODIMENTS

Figure 1:
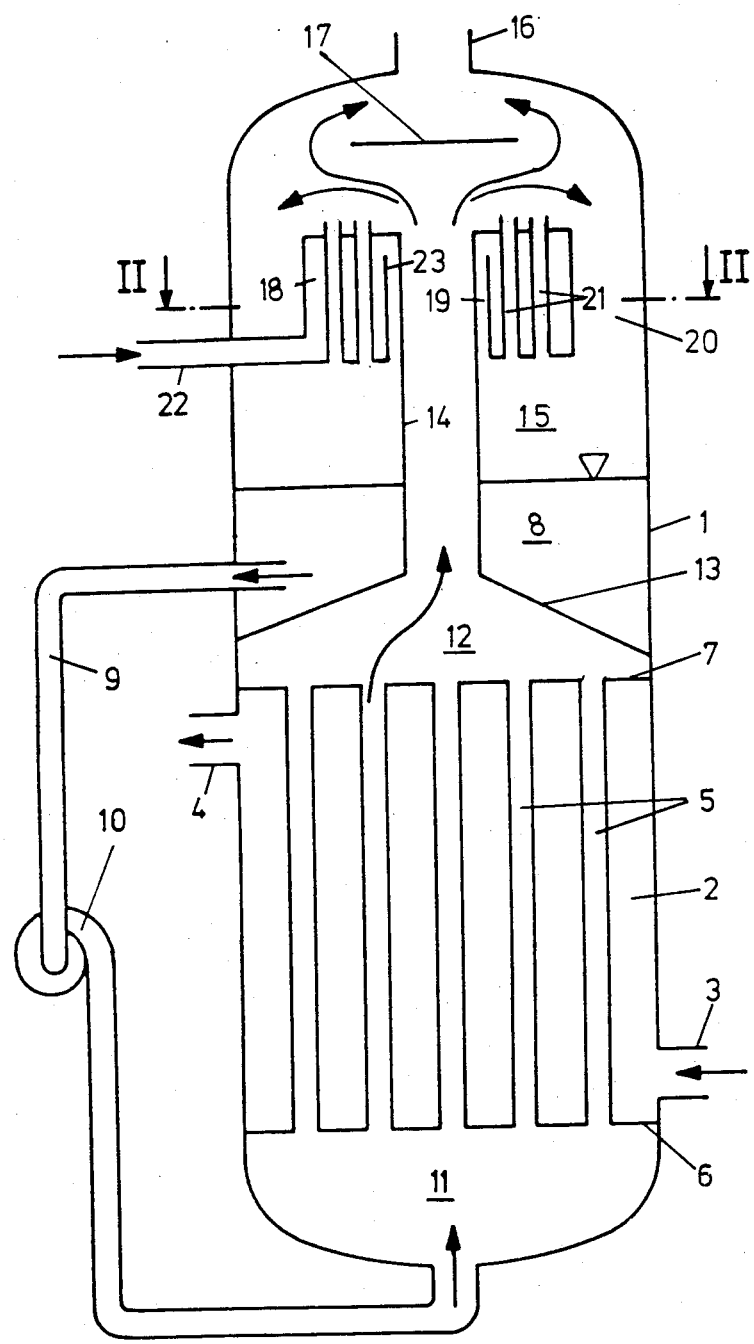
FIG. 1 is a longitudinal section through a device in accordance with the invention and FIG. 2 is a section along the line II—II in FIG. 1.
Figure 2:
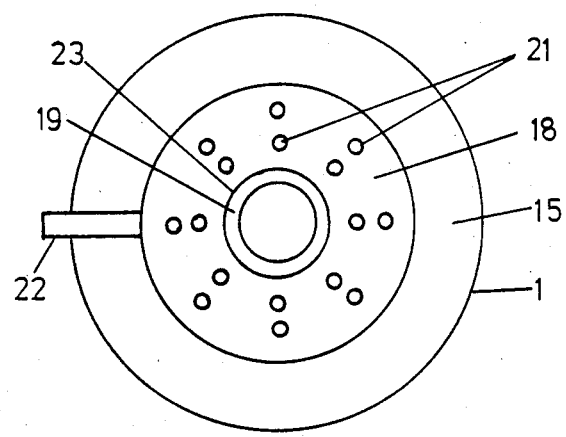

A reactor 2 is positioned inside an upright cylindrical vessel 1. Reactor 2 is employed for carrying out chemical reactions between several reactants, which are supplied through an intake connection 3 and removed through an outlet connection 4.

Cooling pipes 5 are secured to partitions 6 and 7 at the top and bottom of reactor 2 and extend through it. Evaporating water flows through cooling pipes 5, maintaining a reaction temperature that is as uniform as possible throughout the reactor. A space 8 containing a certain level of water in reserve is provided for this purpose in vessel 1.

Water space 8 communicates with an intake chamber 11 through an outside by-pass line 9 that contains a circulation pump 10. Intake chamber 11 is below lower piping-support partition 6 and is demarcated by that partition and by the floor of vessel 1.

Above upper piping-support partition 7 is a collector 12 that accumulates the mixture of water and steam forming in cooling pipes 5 as the water evaporates. The top of collector 12 is demarcated by a conical hood 13 that also constitutes the bottom of water space 8. Collector 12 communicates with an ascending pipe 14 positioned along the longitudinal axis of vessel 1. Ascending pipe 14 extends through water space 8 and empties inside vessel 1 into a steam space 15 above water space 8.

In the roof of vessel 1 is a connection 16 for the steam to exit through. Between steam-exit connection 16 and the mouth of ascending pipe 14 is a baffle 17. Some of the water in the mixture of water and steam condenses on baffle 17 and flows back into water space 8.

Ascending pipe 14 is surrounded inside steam space 15 by a cylindrical preheating section 18, leaving an annular gap 19 between the preheating section and the ascending pipe and an annular space 20 between the the preheating section and the wall of vessel 1.

Pipes 21 extend up through preheating section 18. Pipes 21 open into steam space 15 at each end and extend beyond the top of preheating section 18 to prevent the entrainment of large volumes of water through them.

Preheating section 18 communicates with an inflow 22 for fresh water. The inflow extends into vessel 1 and connects to the bottom of preheating section 18. On the radially inner wall of preheating section 18, the wall that is remote from inflow 22, is an outflow in the form of an effluent weir 23 that opens toward annular gap 19.

Preheating section 18 acts to some extent like a condenser. Fresh water is introduced into the reactor to replace the evaporated water. The fresh water enters the preheating section at a temperature below the evaporation point through inflow 22. Some of the steam generated in reactor 2 and present in steam space 15 condenses on pipes 21. Its heat is transmitted to the incoming fresh water, heating it very close to the evaporation point. The heated fresh water leaves preheating section 18 over effluent weir 23 and flows through annular gap 19 and into water space 8. The condensate that occurs in the pipes 21 in preheating section 18 also arrives in water space 8.

The invention has been described herein with reference to an exemplary embodiment. It will be understood, however, that it is receptable of various modifications, which will offer themselves to those skilled in the art and which are intended to be encompassed within the protection sought for the invention as set forth in the appended claims.

I claim:

1. An arrangement for cooling a reactor comprising: a reactor; a vessel holding a water chamber and a steam chamber; cooling pipes extending through said reactor and carrying evaporating water; said cooling pipes communicating with said water chamber outside the reactor at the intake end, said cooling pipes communicating with said steam chamber at the outflow end outside the reactor; preheating means positioned inside said steam chamber and communicating with an inflow outside said vessel, said preheating means communicating with an outflow inside said steam chamber; open pipes extending through said preheating means from two sides and into said steam chamber; an ascending pipe positioned along a longitudinal axis of said vessel, said ascending pipe extending through said water chamber and into said steam chamber; said preheating means having a cylindrical shape surrounding said ascending pipe with a gap left between said cylindrical shape and said ascending pipe.

2. An arrangement for cooling a reactor comprising: a reactor; a vessel holding a water chamber and a steam chamber; cooling pipes extending through said reactor and carrying evaporating water; said cooling pipes communicating with said water chamber outside the reactor at the intake end, said cooling pipes communicating with said steam chamber at the outflow end outside the reactor; preheating means positioned inside said steam chamber and communicating with an inflow outside said vessel, said preheating means communicating with an outflow inside said steam chamber; open pipes extending through said preheating means from two sides and into said steam chamber; said inflow being connected to the bottom of said preheating means; said preheating means having an effluent weir on a side remote from said inflow.

3. An arrangement for cooling a reactor comprising: a reactor; a vessel holding a water chamber and a steam chamber; cooling pipes extending through said reactor and carrying evaporating water; said cooling pipes communicating with said water chamber outside the reactor at the intake end, said cooling pipes communicating with said steam chamber at the outflow end outside the reactor; preheating means positioned inside said steam chamber and communicating with an inflow outside said vessel, said preheating means communicating with an outflow inside said steam chamber; open pipes extending through said preheating means from two sides and into said steam chamber; said open pipes extending beyond the top of said preheating means.

* * * * *